Nov. 1, 1966  R. A. EKSTROM, JR  3,282,107
SURFACE TEMPERATURE THERMOCOUPLE FIXTURE
Filed May 21, 1965  3 Sheets-Sheet 1
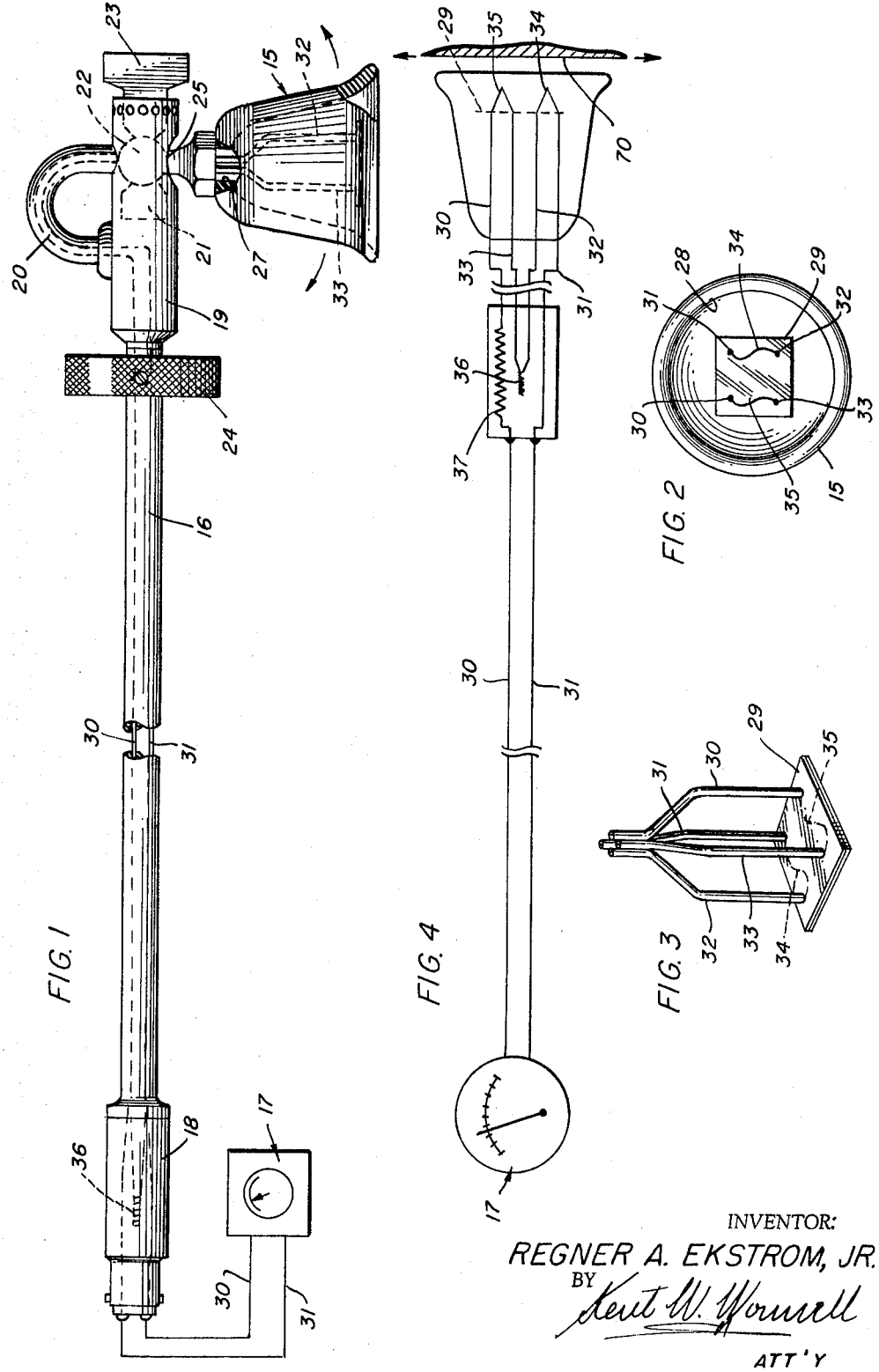
INVENTOR:
REGNER A. EKSTROM, JR.
BY
ATT'Y Nov. 1, 1966  R. A. EKSTROM, JR  3,282,107
SURFACE TEMPERATURE THERMOCOUPLE FIXTURE
Filed May 21, 1965
3 Sheets-Sheet 2
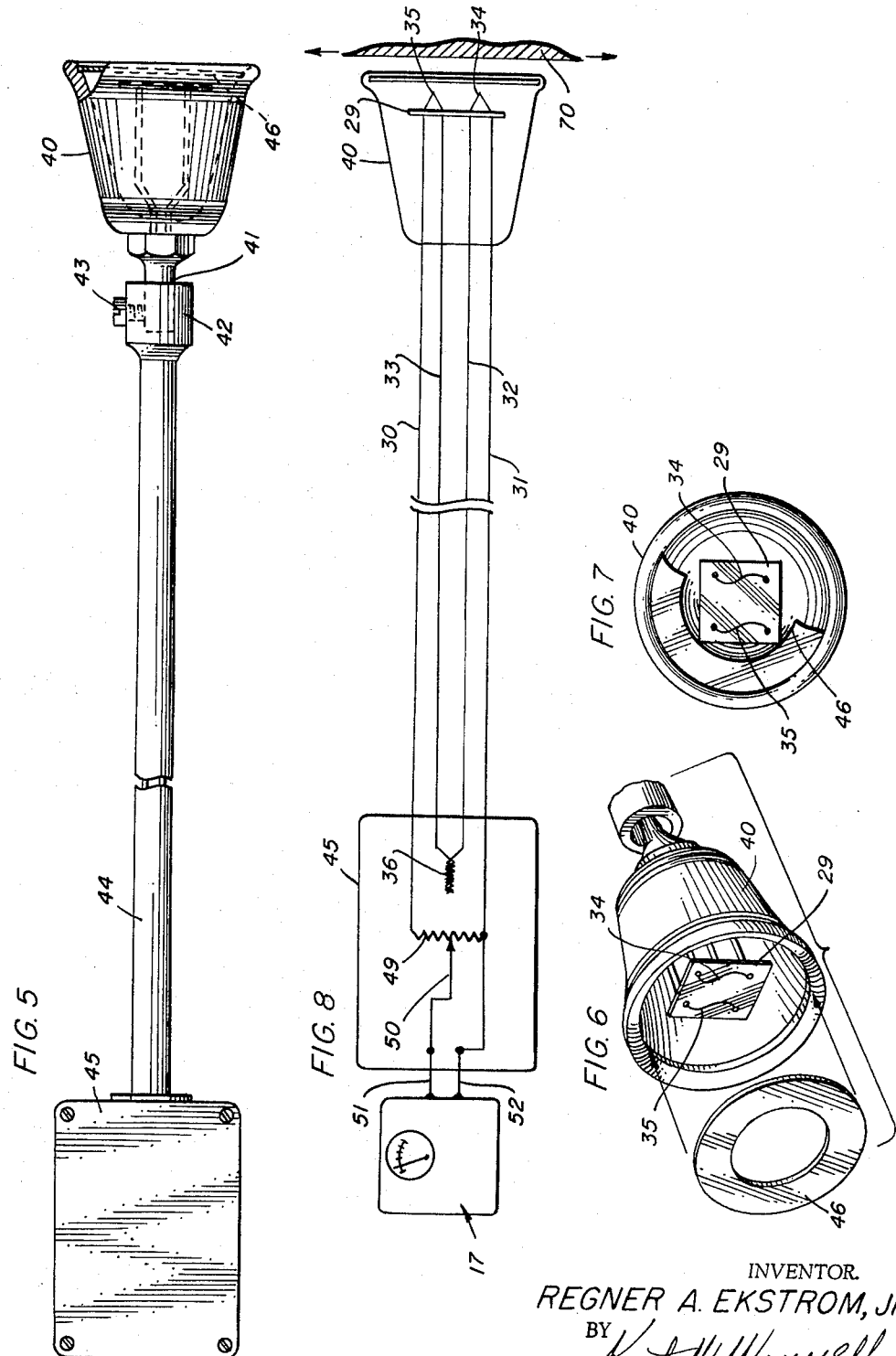
INVENTOR.
REGNER A. EKSTROM, JR.
BY
ATT'Y Nov. 1, 1966 R. A. EKSTROM, JR 3,282,107
SURFACE TEMPERATURE THERMOCOUPLE FIXTURE
Filed May 21, 1965
3 Sheets-Sheet 3
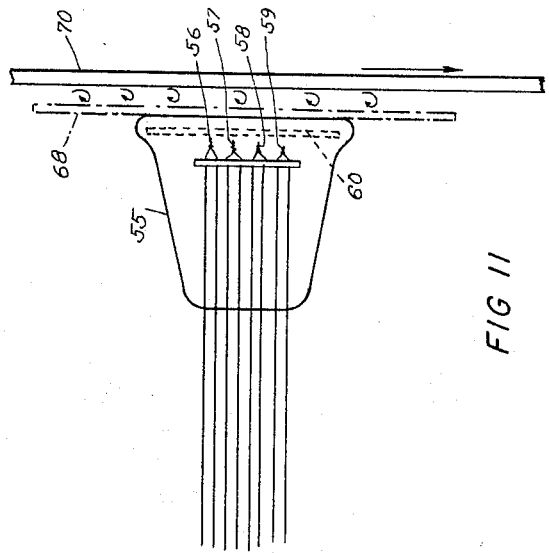
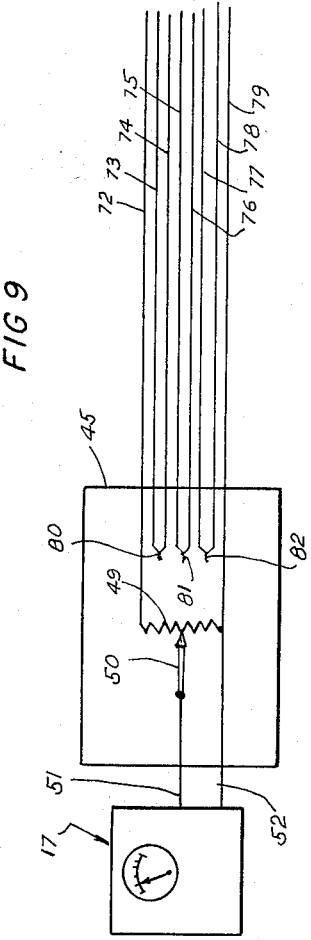
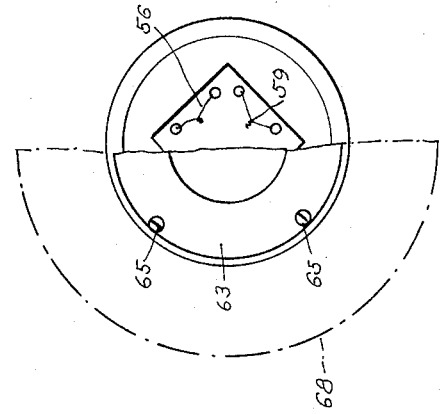
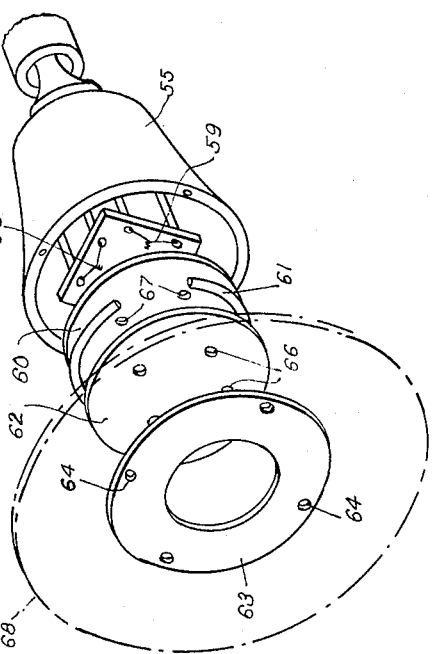
INVENTOR.
REGNER A. EKSTROM, JR.
BY
Kent W. Wonnell
ATT'Y United States Patent Office 3,282,107
Patented Nov. 1, 1966

3,282,107
SURFACE TEMPERATURE THERMOCOUPLE FIXTURE
Regner A. Ekstrom, Jr., 15555 Millard Ave., Markham, Ill.
Filed May 21, 1965, Ser. No. 461,593
13 Claims. (Cl. 73—355)

This application is a continuation in part of my pending application, Serial No. 202,597, filed June 14, 1962, the disclosure of which is incorporated herein by reference. The present invention relates to a thermocouple apparatus for measuring the surface temperature of an object without any direct contact with the object, and the following disclosure is offered for public dissemination upon the grant of a patent therefor.

In many fields it is important to know the temperature of an object and it is inconvenient or undesirable to contact the object. For example, it may be important to ascertain the surface temperature of a moving web of paper, plastic or metal, with accurate control of the temperature being significant in processing of operations in which the web is involved. In many such operations a temperature of the article is well below a temperature at which the article will emit light. As a matter of fact, conceivably the temperature may be well below zero. If the temperature is in a range such that the article is emitting light, i.e. the radiations are in the visible spectrum, the problems attendant the measuring of its temperature are somewhat simplified. When the temperature is below the light emitting range, it becomes much more difficult to measure its temperature without direct contact therewith. While radiant energy is present, it is of a much lower magnitude than that with which one is dealing when operating in the visible spectrum. Furthermore, the ambient conditions may be such that in magnitude they are comparable to the emissions of the body whose temperature is being ascertained, or, to put it another way, the effect of the ambient conditions upon the measuring instrument is comparably more significant when one is measuring the temperature of a body whose emissions are not very great to start with and are in the same general range as the ambient conditions.

By measuring temperature without direct contact with the article the effect of contact irregularities is eliminated. That is, with a contact type measuring device there may be at one time a good heat transfer contact while at other times comparatively poor heat transfer contact. Obviously, this would effect the readings obtained.

The present invention may be made portable or it may be a fixed installation. In any event, it need not be cumbersome. Embodiments can be small and compact, capable of being installed at nearly any point at which a reading is to be obtained. With only minor changes embodiments may have a relatively low sensitivity, or may have a relatively high sensitivity. By the same token, they may have a relatively slow response to changes in temperature of the article being studied, or they may have a relatively fast response time. The ability to make such changes without substantial modification of the apparatus is significant in producing devices which may be used under widely different circumstances. Embodiments are relatively inexpensive to construct. They need substantially no maintenance. The calibrating of the device upon installation is extremely simple, and can be carried out by a relatively inexperienced person. The presence of smoke or vapors in the atmosphere in which embodiments are being employed has substantially no effect upon the accuracy of the readings.

Further objects and advantages will become apparent from the following description taken in conjunction with the drawings, in which:

FIGURE 1 is an elevational view of an embodiment intended for portable use;

FIGURE 2 is a view of the end of the housing for the thermocouples, showing the thermocouples therein;

FIGURE 3 is a perspective view of the structure for mounting the thermocouples;

FIGURE 4 is a schematic illustration of the embodiment of FIGURE 1;

FIGURE 5 is an elevational view of an embodiment for permanent installation;

FIGURE 6 is an exploded view of the thermocouple housing of FIGURE 5;

FIGURE 7 is an end view of the thermocouple housing of FIGURE 5 with portions broken away;

FIGURE 8 is a schematic illustration of the embodiment of FIGURE 5;

FIGURE 9 is a schematic view of another alternative embodiment;

FIGURE 10 is an exploded view of a modified form of detector head, such as might be employed in connection with the embodiment of FIGURE 9; and FIGURE 11 is an end view of the detector head of FIGURE 10, with portions broken away.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements or combinations in which the inventive concepts are found.

The embodiment of FIGURE 1 comprises a detector head, generally 15; a supporting handle, generally 16; and an indicating instrument, generally 17. The particular indicating instrument employed in conjunction with the present invention is not particularly critical and may be one of those commonly employed. For example, it could be a moving vane De Arsonval instrument, or a potentiometer measuring device employing a galvanometer. Generally speaking, the former are less expensive than the latter. It is one of the advantages of the invention that it is not necessary to employ the more expensive measuring instruments in order to obtain satisfactory accuracy of temperature determination. Thus, the overall cost of the assembly may be less than when a potentiometer type instrument is necessary.

The handle 16 includes a rear shell 18, and a front shell 19 connected by a rod conduit. A U-shaped conduit 20 forms a portion of the front housing and provides an enclosure to accommodate the wires from the detector head. Within the front shell 19 is a fixed anvil 21 having a concave end to abut ball 22 of the detector head 15. A thumbscrew 23 is threaded into shell 19 and has a concave end which also abuts ball 22 to press the ball against anvil 21. Thus by loosening thumbscrew 23 the attitude of detector head 15 with respect to handle 16 may be changed and then refixed in position by retightening thumbscrew 23. To facilitate this operation, a knurled annular handhold 24 is secured to handle 16.

From the internal ball 22 a portion of detector head 15 extends through an opening 25 in front shell 19. Detector head 15 is generally bell-shaped, and has a main cavity 28 forming a mouth at the front end thereof. A central opening 27 extends rearwardly from cavity 28 through the remainder of the housing, and serves as a passageway for the wires which then extend into conduit 20. As illustrated in the drawings, the head 15 has a relatively heavy cross-section so that the temperature thereof is relatively stable and does not fluctuate rapidly with sudden drafts or the like. The material employed will depend on the temperatures involved, cost, etc. For most applications an asbestos-cement composition, e.g. Transite, is highly satisfactory. It will withstand temperatures up to about 900° F.

The mounting of the thermocouples within cavity 28 is best illustrated by FIGURES 2 and 3. There is a mica plate 29 having four relatively rigid, insulated wires 30–33 extending therethrough and fixed (e.g. cemented) therein. Between pairs of the wires are fixed thermocouple junctions 34 and 35 lying on the outer face of plate 29. The junctions are secured to the respective wires as by means of welding. What materials are employed for the thermocouples will depend upon the preference of the manufacturer. Materials for this purpose are well known to those skilled in the art. For example, it might be an iron-constan pair, a chromel-constan pair, a copper-constan pair, or a chromel-alumel pair. In any event, the wires 30–33 should be of the same composition as the portion of the pair to which they are affixed. Thus, if the thermocouples were a chromel-constan pair, and if wire 30 were affixed to the chromel portion of the pair, then wire 30 also should be made of chromel; and wire 33, being affixed to the constan half of the pair, should be made of constan. Similarly, in that event, to form the cold junction 36, wire 32 (and the appropriate half of thermocouple 34) should be of chromel (as seen in FIGURE 4). Wire 31 would be constan. A fourth junction is formed where instrument 17 connects wires 30–31. When working above ambient temperatures, junctions 34 and 35 would be "hot" junctions and the remaining two would be the "cold" junctions.

Wires 30–33 extend through passageway 19. After being properly positioned in passageway 19, they are fixed in position by filling the remainder of the passageway with a suitable mastic which will set up to form a rigid support for the wires. The schematic wiring diagram is illustrated in FIGURE 4. A resistor 37 is employed in the circuit for calibrating purposes, as hereinafter described.

The relatively large and rigid wires form a secure mounting for the hot thermocouples. At the same time they define relatively low loss current paths for the electricity generated by the thermocouples. The wires making up the hot junctions 34 and 35 are relatively thin. Thus, they react rapidly to changes in temperature of the object whose temperature is being measured.

Referring to the embodiment of FIGURES 5–7, it comprises a bell-shaped housing or head 40 having a fixed stem 41. Stem 41 is received in a socket in end 42 and held in place by a setscrew 43. Socket end 42 is a part of an arm 44 held by a junction box 45. Junction box 45 is fixed in position. The mounting of the hot junctions 34 and 35 on plate 29 in housing 40 is the same as that for the embodiment for FIGURES 1–4. Head 40 has a window, generally 46, consisting of an annular rim or bezel with a central insert of sapphire glass or mica through which the heat will pass to act upon the hot junctions 34 and 35. In some embodiments, as illustrated in FIGURES 2, 3, 6 and 7, the hot junctions 34 and 35 are in contact with mica plate 29. Thus, mica plate 29 acts as a heat receptor plate and reflector.

Wires 30 and 31 are connected to the opposite ends of a resistance 49 of a potentiometer having a slider 50. Thus, as is well known in the art, the resistance 49, along with instrument 17, forms the cold junction connection. Slider 50 is connected to a wire 51, and one end of resistance 49 is connected to a wire 52, both leading to the measuring instrument 17. The potentiometer 49–50 is adjusted for calibration purposes.

FIGURES 9–11 illustrate an embodiment having a detector head with a bell-shaped housing or head 55 with the hot junctions 56–59 of four thermocouples mounted therein. Hot junctions 56–59 are in heat transfer contact with a heat-receptor plate 60. Heat-receptor plate 60 is most efficient if it is black. A coating of colloidal graphite on the outer face thereof is used for this purpose. It is important that the graphite be in colloidal form so that it has a relatively low heat inertia. To obtain good heat transfer characeristics the rear face should be of a material into which the hot junctions are embedded, such as a varnish or plastic. The plate itself may be a thin sheet of mica, plastic or metal. Of course, to the extent that an electricity conducting material is employed, it will be necessary to insulate the hot junctions therefrom. This may be done by means of the varnish or plastic into which the hot junctions are embedded.

Outside of the heat-receptor plate 60 is a spacer ring 61 and then a window 62 of mica or sapphire glass. The assembly is held to housing 55 by a bezel 63 having openings 64 through which screws 65 extend to be threaded into housing 55.

In some embodiments window 62 and heat-receptor plate 60 are provided with openings, the openings being designated 66 and 67 respectively. The purpose of such openings is to provide air circulation from the exterior to the interior of the housing. They are not necessary, or even desirable, in all embodiments. Without the openings, the detector has a comparatively fast response, with a relatively low sensitivity. When the openings are employed, the same detector will have a relatively slow response, but will have an increased sensitivity.

In embodiments where there is a great deal of air circulation about the detector head, it is necessary that the detector not be greatly affected by this air circulation. For example, air may be blown against the surface of the material whose temperature is being measured to displace dirt or lint therefrom. Particularly if the holes in the window are employed, such air circulation may cause the temperature readings to fluctuate and be inaccurate. To eliminate this factor, a bezel having a substantially enlarged diameter, such as illustrated at 68, is employed. This forms a skirt about the sensing end of the detector head. Actually, the skirt should be substantially larger than is illustrated in FIGURE 10. A skirt having an external diameter of at least 1½ times the outer diameter of the detector head produces an immediately noticeable, and substantial, reduction in the elimination of inaccuracies due to ambient air flow about the head. A skirt having a diameter of about three times that of the detector head seems to be the most generally desirable size. Above about four times, there is little noticeable conditional effect in reduction of varying air circulation effects on the thermocouples. Thus, with a detector head having an outer diameter (about the heat receiving opening therein) of 1⅝ inches, a skirt having an outer diameter of 5 inches is eminently satisfactory.

As a web 70 (whose temperature is to be measured) moves rapidly past the detector head 55, as illustrated in FIGURE 9, it sets up an air turbulence between the detector head and the web. An enlargement of the bezel to at least 1½ times the diameter of the head increases the effective turbulence in the area in front of the detector head. Furthermore, the enlarged bezel screens the area in front of the detector head from other air currents, and ensures that the detector head is subjected to air currents flowing only from the face of the web.

The hot junctions 56–59 are respectively formed by wire pairs 72–73, 74–75, 76–77 and 78–79. Wires 73 and 74 also form a cold junction 80; wires 75 and 76 form a cold junction 81; and wires 77 and 78 establish a cold junction 82. As previously explained, the materials of the wires would be selected so as to give the appropriate junctions. Wires 72 and 79 are connected across resistance 49 of the potentiometer, having a slider 50. Wires 51 and 52 connect the potentiometer to the measuring device 17.

With the embodiments of FIGURES 8 or 9, the detector head is mounted in the desired position. Usually this is as close to the material as is practical, while making sure that the material 70 does not contact the detector head. A spacing of an eight inch is the most effective from the standpoint of meeting all of the attendant problems. Greater spacing is apt to result in unstable or inaccurate readings. Smaller spacings are apt to introduce problems with regard to contact with the moving web.

At the time of manufacture, the indicating instrument 17 will have been calibrated to read the temperature of the hot junctions 34–35 or 56–59 on a scale encompassing the entire range of operation for which the device is suited. This calibration is well known to those skilled in the art. After the device has been installed, it is only necessary to adjust the apparatus for one temperature and it will correctly read over its range of operation. This field adjustment or calibration is done by determining the surface temperature of the object being studied, e.g. the surface of web 70. This is done by the use of another instrument, as for example the surface contact type of temperature detector disclosed and claimed in my previously identified patent application. As a first step, the machine embodying or using web 70 should be operated for a sufficient period of time to stabilize the temperature conditions of all of the parts, including that of the detector head. After temperature stabilization has been achieved and the temperature of the surface of web 70 is ascertained by another instrument, slider 50 of the potentiometer is adjusted so that the ascertained temperature is read on the indicating instrument 17. The device now is completely calibrated. It will retain its calibration so long as significant conditions are not changed; e.g. if the spacing between the detector head and the web 70 is changed, a recalibration will be required. In some instances, the speed at which the web 70 is moving may affect the calibration.

As is suggested by the embodiment of FIGURES 1–4, the calibration may be permanently built into the instrument by means of fixed resistor 37. Thus, for example, the user would be advised that with such an instrument the detector head 15 always should be held ⅛ inch away from the web 70. While it might seem that this would require some skill on the part of the user to obtain and maintain the proper spacing, this is not unduly critical. The user will obtain a good knowledge of the temperature of the object even though he may not be too careful in obtaining the exact spacing. However, if accuracy of readings is important in a particular instance, a fixed mounting of the detector head is preferable to a manually supported detector head.

The use of a plurality of thermocouples has significant advantages. In the first place it enables the apparatus to read temperatures outside of the visible spectrum. Devices for such purposes are not prevalent, as is the case with respect to devices for reading temperature where the emission is in the visible spectrum. Since the readings are not dependent on the visible spectrum, they are not subject to the inaccuracies caused by color changes for reasons other than temperature, such as occurs with respect to apparatus which is sensitive to the color of the object being read.

For a general purpose apparatus, produced by a manufacturer to be used under a variety of circumstances, it is important that the detector head have at least four hot junctions, which are connected in series at their cold junctions. The use of three hot junctions is eminently satisfactory for many installations, but does not provide the versatility of meeting all installations that will be achieved by a four-hot-junction detector head. A two-hot-junction detector head is suitable for some applications, particularly those where a close spacing can be obtained and those where a high degree of accuracy is not significant. The use of a multiple of hot junctions permits the employment of less expensive reading apparatus 17, making the whole device less expensive. It reduces the accuracy required in mounting the apparatus.

I claim:

1. In a thermocouple fixture, means forming a hollow holder head for application of one open end adjacent to a relatively movable heated surface of which the temperature is measured, thermocouple wires mounted in pairs in the head, an insulated plate mounted in the head through which pairs of wires extend with the protruding ends of each pair being joined and spaced from other pair of wires with a looseness at the ends for bending them against and away from the plate, disk means receptive to heat radiation at the open end of the head to contact with said abutting ends and limit them within the plane of the open end of the head, and a spacing disk in addition to said means with spacer means between the spacing disk and the disk means to space the two apart and form a thin air space between them for preventing ambient currents from reaching the wire ends, said disk means and said spacing disk being selectively provided with perforations therethrough to equalize the air temperature inside the head with that in front of the head.

2. In a thermocouple fixture, means forming a hollow holder head for application of one end adjacent to the relatively moveable heating surface of which the temperature is measured, said head having a mounting adjustable at different angles with a spherical fitting, a cylindrical sleeve with a pair of blocks to engage the spherical fitting, said sleeve having an opening through which the fitting extends loosely to allow a limited universal adjustment thereof when the spherical fitting is between the blocks, thermocouple wires mounted in pairs in the head and extending through the spherical fitting, and an insulated plate mounted in the head through which the pairs of wires extend with the protruding ends of each pair being joined and spaced from the other pair of wires with a looseness at the ends for bending them against and away from the plate.

3. In a thermocouple fixture in accordance with claim 2, a knurled collar near one end of the cylindrical sleeve, a thumbscrew projecting from the other end of the sleeve and connected to one of the blocks for engaging the spherical fitting so that the fixture may be held with one hand engaging the collar and the other hand engaging the thumbscrew for adjusting its block to engage the spherical fitting for limited universal variation.

4. In a surface temperature thermocouple wire fixture having a remote electro-responsive device connected by wires from the thermocouple wires calibrated to indicate the temperature to which the thermocouple wires are exposed:

(a) a plurality of pairs of thermocouple wires connected in series, (b) each pair of wires (a) abutting at the other ends, (c) an insulating plate of mica having holes spaced apart for insertion therethrough of each pair of wires before the ends (b) are abutted together, with the butted ends on the outer side of the plate and the holes also spaced apart for spacing each pair of wires from the other, (d) the terminal wires of the series (a) having a compensating variable resistance inserted between them and the wires to the said indicating device, (e) a surrounding bell holder open at one end in which the wires (a) and the plate (c) are enclosed with the said abutted ends (b) exposed within the plane of the open end of the bell.

(f) a pair of mica sheets spaced apart at their margins to form a thin dead air space and to engage the butted ends (b) on the outer side of plate (c) and (g) a bezel insertable and secured in the open end of the bell (e) against the outer side of the spaced mica sheets (f) to press them against the butted wire ends (b) and the inner opening of the bezel forming a window through which radiated and convected heat will pass to the thermocouple abutted wire ends (b), and closing the outer end of the bell (e) from the entry of ambient currents to the said butted wire ends.

5. In a radiation measuring device, the improvement comprising a bell-shaped housing having a mouth; a perforate heat permeable window across said mouth; insulating plate means in said housing and positioned generally parallel to said mouth and immediately adjacent said window; a plurality of thermocouple junctions mounted on said plate means; a conduit connected to and extending rearwardly from said housing to an end remote from said housing; and circuit means connected to said junctions and with said junctions forming a plurality of thermocouples connected in series and having a second plurality of junctions adjacent said end of said conduit, said circuit means including a calibration resistor.

6. In a radiation measuring device, the improvement comprising a bell shaped housing having a mouth, said housing having a skirt extending outwardly from said mouth and generally parallel thereto, the minimum external dimension of said skirt, as measured in the plane of said mouth, being at least one and a half times the corresponding dimension of said housing, a heat permeable window across said mouth; insulating plate means in said housing and positioned generally parallel to said mouth and immediately adjacent said window; a plurality of thermocouple junctions mounted on said plate means; a conduit connected to and extending rearwardly from said housing to an end remote from said housing; and circuit means connected to said junctions and with said junctions forming a plurality of thermocouples connected in series and having a second plurality of junctions adjacent said end of said conduit, said circuit means including a calibration resistor.

7. In a radiation measuring device, the improvement comprising a bell-shaped housing having a mouth; heat receptor means in said housing, said means being generally planar and positioned generally parallel to said mouth; a plurality of first thermocouple junctions in said housing, said junctions being positioned in spaced relationship to each other and in heat transfer contact with said means; and circuit means connected to said junctions and with said junctions forming a plurality of thermocouples connected in series and having a second pair of junctions spaced from said housing; except for said circuit means, said junctions being electrically insulated from each other; and a perforate heat permeable window outside of said heat receptor means.

8. In a radiation measuring device the improvement comprising: a housing having an internal cavity and open at one end to define a mouth; a planar plate positioned in said cavity and generally parallel to said mouth; a plurality of pairs of relatively large and rigid wires and a plurality of pairs of relatively thin wires, one wire of each pair being of one metal and the other wire being of a different metal, said rigid wires being affixed to said plate and extending rearwardly therefrom, said rigid wires being secured to said housing and serving as a mounting for said plate, each thin wire being affixed to a rigid wire of the same metal and extending across the front of said plate and there connected to a thin wire of a different metal; and circuit means connected to and including said wires, said circuit means defining at least four, series connected, thermocouple junctions, at least two of which junctions are formed by said relatively thin wires, said circuit means including an indicating means to measure the electromotive force in said series connected thermocouples and also including a calibrating resistance.

9. In a radiation measuring device the improvement comprising: a housing having an internal cavity and open at one end to define a mouth; a planar plate member positioned in said cavity and generally parallel to said mouth; a plurality of pairs of relatively large and rigid wires and a plurality of pairs of relatively thin wires, one wire of each pair being of one metal and the other wire being of a different metal, said rigid wires being affixed to said plate and extending rearwardly therefrom, said rigid wires being secured to said housing and serving as a mounting for said plate, each thin wire being affixed to a rigid wire of the same metal and extending across the front of said plate and there connected to a thin wire of a different metal forming a junction; circuit means connected to and including said wires, said circuit means defining at least four, series connected, thermocouple junctions, at least two of which junctions are formed by said relatively thin wires, said circuit means including an indicating means to measure the electromotive force in said series connected thermocouples and also including a calibrating resistance; and a disk member adjacent the mouth and closing said cavity; one of said members being a heat receptor and in contact with said thin wire junctions.

10. In a radiation measuring device according to claim 9, the disk member being mica and adapted to engage the protruding wire ends, and a bezel secured to the open end of the holder head to confine the mica plate therein with a central window aperture over the said abutting wire ends.

11. In a radiation measuring device, according to claim 10, a spacing disk in addition to said disk member with spacer means between the spacing disk and the disk member to space the two apart and form a thin air space between them for preventing ambient currents from reaching the wire ends.

12. In a radiation measuring device, in accordance with claim 9, in which the disk member comprises a plastic which is a non-conductor of electricity and in contact with said abutting ends.

13. In a radiation measuring device, in accordance with claim 9, in which the disk member comprises a thin metallic disk coated at least on the inner side with an electrical insulating plastic varnish and in contact with said abutting ends.

References Cited by the Examiner
UNITED STATES PATENTS

| | | | |
|---|---|---|---|
| Re. 19,564 | 5/1935 | Quereau | 136—4.6 |
| 919,399 | 4/1909 | Thwing | 73—355 X |
| 1,734,837 | 11/1929 | Thwing | 250—83.3 X |
| 1,883,444 | 10/1932 | Albert | 73—359 X |
| 2,441,672 | 5/1948 | Ray | 136—4.6 |
| 2,611,541 | 9/1952 | Gray. | |
| 2,635,468 | 4/1953 | Field et al. | 73—355 |
| 2,813,203 | 11/1957 | Machler | 73—355 X |
| 2,837,917 | 6/1958 | Machler | 73—355 |
| 2,911,456 | 11/1959 | Volochine | 136—4.6 |

LOUIS R. PRINCE, *Primary Examiner.*

S. H. BAZERMAN, *Assistant Examiner.*